United States Patent [19]

Foote

[11] 4,100,011

[45] Jul. 11, 1978

[54] PRODUCTION OF LAMINATED CARD WITH PRINTED MAGNETICALLY ENCODABLE STRIPE

[75] Inventor: Francis C. Foote, Huntsburg, Ohio

[73] Assignee: Addressograph Multigraph Corp., Cleveland, Ohio

[21] Appl. No.: 789,668

[22] Filed: Apr. 21, 1977

Related U.S. Application Data

[63] Continuation-in-part of Ser. No. 601,366, Aug. 4, 1975, abandoned.

[51] Int. Cl.² ................ B29C 27/02; B32B 31/26
[52] U.S. Cl. ..................... 156/272; 40/2.2; 156/277; 156/286; 156/290; 156/301; 156/306; 283/7; 428/900; 428/916
[58] Field of Search .......... 156/285, 286, 298, 290, 156/272, 301, 302, 324, 497, 277, 278, 306; 283/7; 40/2.2; 427/128; 428/900, 916; 264/102

[56] References Cited

U.S. PATENT DOCUMENTS

| | | | |
|---|---|---|---|
| 3,247,041 | 4/1966 | Henderson | 156/272 |
| 3,616,036 | 10/1971 | Anderson | 156/298 |
| 3,627,858 | 12/1971 | Parts et al. | 264/25 |
| 3,716,439 | 2/1973 | Maeda | 40/2.2 |
| 3,811,977 | 5/1974 | Kramer | 156/290 X |
| 3,821,060 | 6/1974 | Braca et al. | 156/298 X |
| 3,852,136 | 12/1974 | Plumat et al. | 156/286 X |
| 4,025,380 | 5/1977 | Bernardo | 156/497 X |

FOREIGN PATENT DOCUMENTS

| | | | |
|---|---|---|---|
| 1,953,883 | 5/1971 | Fed. Rep. of Germany | 156/286 |
| 316,134 | 10/1930 | United Kingdom | 156/286 |

Primary Examiner—Michael G. Wityshyn
Attorney, Agent, or Firm—S. L. Goldstein; H. Fleck

[57] ABSTRACT

In production of a credit card or other magnetically encodable articles, a thermoplastic surface laminate layer is thermally tacked to a core stock layer and a magnetically encodable stripe is printed, for example, silk screened, on the laminate-core stock assembly. The resulting assembly is laminated to provide a smooth magnetic stripe having minimal distortion.

7 Claims, 8 Drawing Figures

PRODUCTION OF LAMINATED CARD WITH PRINTED MAGNETICALLY ENCODABLE STRIPE

This application is a continuation-in-part of application, Ser. No. 601,366, filed Aug. 4, 1975, now abandoned.

BACKGROUND OF THE INVENTION

This invention relates to the production of laminated articles having magnetically encodable stripes printed thereon.

Cards having magnetically encoded stripes or other portions thereon are useful in many different applications. Such cards may be magnetically encoded identification cards, cards to program a calculator, or credit cards. While the present invention is useful in these and other areas, it is discussed in the context of a credit card, since there is great commercial interest in this area. It should be noted that the following discussion is applicable to other forms of magnetically encoded articles as well as credit cards. One common form of credit card is formed by utilizing a core stock of a material such as polyvinyl chloride acetate (PVCA) having opaque agents and plasticizers mixed in the polymeric matrix. The core stock is the layer of the card on which words, symbols and even pictures may be printed. In order to protect the core stock and give the card its shiny finish, surface laminates are used. A surface laminate may, for example, consist of a layer of polyvinyl chloride (PVC) or PVCA. A common, reliable way of providing a magnetically encodable stripe or panel is the transfer of magnetic medium to the laminate from a carrier under the influence of heat and pressure, commonly referred to as "hot stamping."

However, in the past several years, methods have been explored for printing magnetic stripes on cards. A preferred method of printing magnetic stripes is silk screening. Printing offers increased production rates with respect to provision of magnetic stripes using lengths of magnetic tape. Further, the shape of a magnetically encodable area which is printed is not restricted to the shape of a piece of tape. By printing magnetic areas having the shape of a circle, oval or an irregular shape may be provided if desired. Potential problems arise due to the nature of printing magnetic stripes on a lamina. Magnetic ink consists of magnetic oxide particles in a slurry which includes solvents. When the stripe is printed on the card, surface distortion of the stripe due to the action of the solvents on the lamina commonly results.

Non-uniformities in magnetic oxide distribution and in stripe surface flatness adversely affect the card's capability of providing useful readback signals when the card is placed in a card reader. In the reading process, a magnetic stripe is placed under a read head (or recording heads) which are quite sensitive to separation from the stripe. In the use of nominal read and recording heads, a magnetic layer cannot be more than ¼ mil below the upper surface of a card. Further, non-uniformities in vertical distance, vertical being the direction normal to the plane in which the core stock lies, greatly affect signal to noise ratio in the electronic reading of characters from the card. The requirements for credit cards which are useful in standardized card readers are set forth in standard ANSI X4. 16-1973, American National Standard Magnetic Stripe Encoding for Credit Cards, published by the American National Standards Institute, New York, N.Y., 1976. This standard requires that the average peak-to-peak surface irregularity of the reading surface shall not exceed 15 microinches. It is further required that the surface stripe profile deviations from a straight line edge-to-edge shall be no more than 150 microinches for each 1/10 inch width of stripe.

SUMMARY OF THE INVENTION

It is therefore an object of the present invention to provide a method for providing a magnetically encodable card in which a magnetically encodable area is printed on a lamina and in which the provision of a flat card and a flat, smooth magnetic stripe are facilitated.

It is also an object of the present invention to provide a method for producing a credit card having a magnetically encodable stripe printed on a lamina within dimensional tolerances required of credit cards.

It is a specific object of the present invention to provide a method for making a magnetically encoded card in which a surface laminate is tacked on a core layer prior to printing of the magnetic stripe on the surface laminate, a magnetically encodable area is printed on the tacked surface laminate, and in which lamination of the surface laminate on the core layer is then performed.

It is a general object of the present invention to provide a relatively low cost and highly reliable method of providing a flat, smooth magnetically encodable area in a lamina of a magnetically encodable card or the like.

Briefly stated, in accordance with the present invention, there is provided a method for producing a card having a magnetically encodable area in a lamina in which provision of a flat card and nondistorted magnetically encoded area is facilitated. A core stock is provided, a surface laminate is tacked to the core stock but not laminated thereto. The magnetically encoded area is printed on the surface laminate and the surface laminate is then laminated to the core stock. In this manner, distortion of the core stock and magnetic stripe printed thereon is minimized.

BRIEF DESCRIPTION OF THE DRAWINGS

The means by which the foregoing object and features of invention are provided are pointed out with particularity in claims forming the concluding portion of the specification. The invention, both as to its organization and manner of operation, may be further understood by reference to the following description taken in connection with the following drawings.

Of the drawings.

DESCRIPTION OF THE PREFERRED EMBODIMENT

Figure 1:
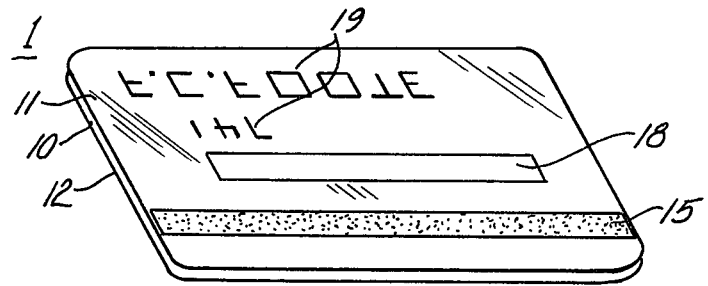
FIG. 1 is an isometric illustration of a credit card exemplifying a magnetically encodable article produced in accordance with the present invention.

Referring now to FIG. 1, there is illustrated a credit card 1 constructed in accordance with the present invention consisting of core stock 10, and upper and lower surface laminates 11 and 12, and having a magnetically encoded area 15 printed on the upper surface of the laminate 11. The magnetically encoded area 15 will hereinafter be referred to as the magnetic stripe 15 since in most applications a stripe will be desired. However, in the present description, it should be noted that the magnetic stripe 15 could be any desired shape. The illustration of FIG. 1 could, for example, be the reverse side of a "BankAmericard." However, the present invention is not limited to credit cards; the credit card 1 should be regarded as exemplary of a magnetically encodable article having a magnetically encodable area formed in a lamina.

The core stock 1 has printing 18 formed thereon. The printing 18 consists of human-readable indicia and should not be confused with the printed stripe 15. The term printing in the description of the printed stripe 15 refers to method of application thereof and not its appearance. For completeness of illustration, embossing 19 is also illustrated as would appear on a finished credit card 1. The embossing 19 is seen in reverse since the reverse side of the card is illustrated. It should be noted, however, that embossing is performed after completion of making of the article in accordance with the present invention. The core stock 10 in the preferred form consists of polyvinyl chloride acetate (PVCA) or polyvinyl chloride (PVC) having opaquing agents and plasticizers mixed in the polymeric matrix thereof, and the upper and lower surface laminate 11 and 12 preferably consists of PVC or PVCA in thin sheet form.

Figure 2:
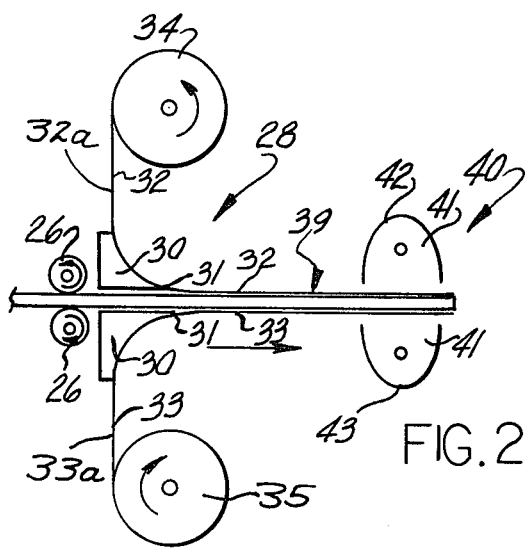
FIG. 2 is a mechanical schematic illustration of application of surface laminate material to core stock and of the tacking of the surface laminate material.

In accordance with the present invention, it is desired to apply surface laminate material to core material, tack the surface laminate material thereto and then form a magnetically encodable area on surface laminate material. This process is begun as shown in FIG. 2, which is a mechanical schematic diagram. A core stock sheet 25 is moved by material handling means 26 in a path through a work station 28 at which surface laminate material is applied thereto. In the present embodiment, the core stock sheet 25 moves from left to right as seen in FIG. 2 through a pair of vacuum shoes 30 each adjacent to an upper and a lower surface of the sheet 25. Forward ends 31 of the vacuum shoes 30 (forward being with respect to the direction of the sheet 25 through the vacuum shoes 30) form a vacuum plenum. The upper and lower surface laminate film layers 32 and 33 are provided from upper and lower rolls 34 and 35 respectively. The upper and lower surface laminate sheets 32 and 33 are respectively affixed to upper and lower surfaces of the core stock sheet 25 when the sheet 25 initially passes through the vacuum shoes 30. As motion of the sheet 25 continues, an outer surface 32a and 33a respectively of each of the surface laminate films 32 and 33 flow across and in contact with the vacuum shoes 30, and the partial vacuum created between each film 32 and 33 and sheet 25 adheres them to the upper and lower surfaces of the sheet 25 by means of static electricity. The surfaces of the vacuum shoes 30 which hold the films 32 and 33 in place are shaped to eliminate wrinkles in the films 32 and 33. An assembly 39 of the core sheet 25 and upper and lower films 32 and 33 proceeds to a tacking station 40 including tacking means 41.

In the preferred embodiment, the tacking means comprises a pair of infrared radiant energy sources 41 for the upper lower laminate films. The energy sources are commercially available quartz lamps with linear type filaments disposed generally parallel to the core stock surface. The lamps are each provided with suitable radiant energy reflectors as indicated by numerals 42 and 43. In the preferred embodiment, each reflector is of elliptical configuration with the lamp filament disposed at or near the inner-most focus line of the ellipse. The core stock surfaces are located at or near the outer focus lines of the elliptical reflectors. This concentrates or focuses the radiant energy along narrow areas, approximately 1 to 5 mils wide, extending transversely across the core stock on opposite sides thereof. Preferably, the width of each of these areas does not exceed 10 mils. This optimizes the lamp size and energy required for tacking and reduces the likelihood of deformation.

It is important to note that if large quantities of radiant energy were to be expended for tacking, or if such were to be spread out over a wide area, the resultant heat generated could lead to core stock deformation or render such too flexible to handle satisfactorily. By concentrating or focusing the radiant energy along a narrow area transverse to the direction of motion, the build-up of heat in the core stock may be controlled satisfactorily to avoid deformation, yet enough energy is transferred to tack or fuse the laminate to the core stock surface at the points of contact. Since the heat build-up is limited to a very short length of the core stock, the likelihood of deformation is significantly decreased.

Of course, it is not intended that the present invention be limited to the use of elliptical reflectors. Various types of reflectors or other optical means may be utilized, so long as the energy is concentrated or focused sufficiently on the core stock surface to achieve tacking without excessive heat build-up which might lead to deformation.

Figure 3:
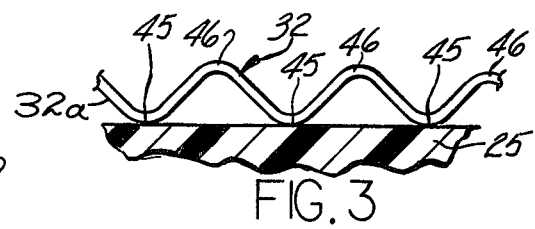
FIG. 3 is a detailed illustration in cross sectional form of a surface laminate tacked to core stock.

FIG. 3 is a partial detailed view of the core stock sheet 25 and film 32 thereon illustrating the adherence of the film 32 to the upper surface of the sheet 25 in greater detail. The film 32 is seen in cross-section, and the deviations of the surface thereof from flatness are greatly exaggerated for the purposes of illustration. The typical PVC film from which the clear laminate layer is formed is, in its unlaminated form, initially a crinkle finish film having minor surface variations. Thus, in the strictest sense, when the film 32 is laid down on the sheet 25, it is substantially entirely in contiguous contact. In actuality, only points 45 are in contact. Portions 46 of the film 32 are raised with respect to portions 45 and do not contact the sheet 25. In the tacking process, the radiant energy means 42 is directed at the upper surface of the sheet 25 through the film 32. Due to the nature of radiant heating, heat sufficient to cause adherence of the film 32 is generated at the upper surface of the sheet 25. Consequently, the film 32 is tacked at the points 45 but not laminated to the surface 25. As seen in FIG. 2, the lower film 33 is similarly tacked but not laminated to the lower surface of the sheet 25.

Application of surface laminate films 32 and 33 to opposite sides of the sheet 25 and tacking in the above-described manner is particularly advantageous in that simultaneous and symmetrical application and adhering of material to the upper and lower surfaces of the sheet 25 is provided. Therefore, curvature of the sheet 25 due to nonuniform treatment of one side of the sheet 25 is completely or substantially completely eliminated.

Figure 4:
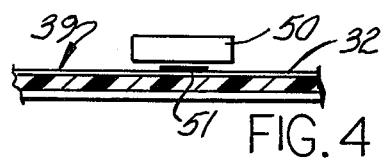
FIG. 4 is a cross-sectional view of the step of printing a magnetically encodable area on a lamina.

Subsequent to the step of tacking, a magnetically encodable panel is printed on the upper surface laminate film 32, as seen in FIG. 4, which is a cross-sectional view of an assembly 39 and printing means 50. In the present embodiment, the printing means 50 comprises conventional silk-screening apparatus. Other well-known means of applying magnetic inks could be utilized. A panel 51 which will comprise the magnetic stripe 15 after lamination is thus provided on the upper surface of the surface laminate film 32.

Figure 5:
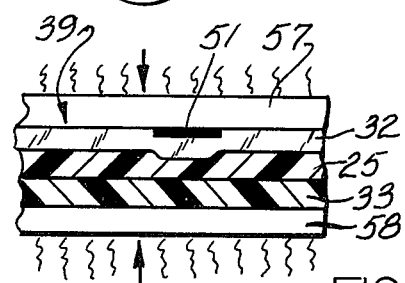
FIG. 5 is an illustration of the step of laminating a surface laminate and magnetic stripe to core stock.

FIG. 5 is a mechanical schematic diagram in crosssectional form of the lamination of the upper and lower films 32 and 33 onto the core stock sheet 25. Lamination is performed after the ink in the panel 51 is substantially dry. In the present embodiment, upper and lower pressure platens 57 and 58 are provided for laminating. Lamination techniques are well known and many suitable techniques are appropriate. In one embodiment, the pressure platens 57 and 58 are heated to 130° C and apply a pressure of 166 lbs/sq. in. Lamination may take place after, for example, 3 minutes of application of this heat and pressure. It is during this process that the upper and lower surface films 32 and 33 become the flat, shiny surface laminates 11 and 12, respectively. Preferably, polymeric material 25 has a lower flow temperature than film 32 such that it is distorted in an area beneath the panel 51 as illustrated in FIG. 5. Polymeric material in the film 32 also flows to accommodate the contour of the panel 51 as the panel 51 is press polished by the platen 57.

After the lamination and press polish operation has been completed, the finished assembly 39 is cut and finished by well-known means, not illustrated, to provide a plurality of credit cards, such as illustrated in FIG. 1. Preferably, each assembly 39 provides a 7 × 9 format which is cut into 63 credit cards. This is achieved by first cutting the assembly longitudinally to form seven elongated sections. Each of these sections is then cut and trimmed to form nine credit cards.

Figure 6:
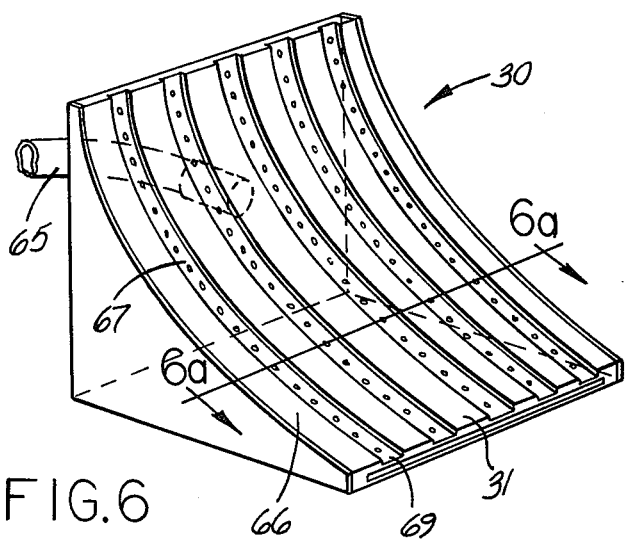
FIG. 6 is a perspective view of one of the vacuum shoes associated with the present invention.
Figure 6A:
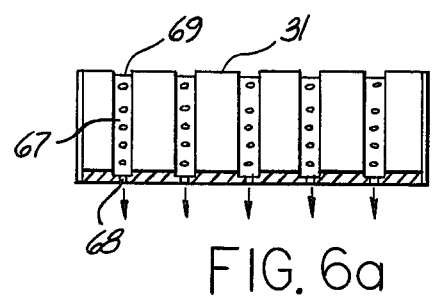
FIG. 6a is a sectional view taken along section 6a—6a of FIG. 6.

Referring to FIGS. 6 and 6a, the construction and operation of the vacuum shoes 30 may be more fully understood. Each shoe is of generally hollow configuration and includes appropriate connection means 65 for connection to a vacuum source. A guide surface 66 is provided which guides film 32 or 33, as the case may be, from its supply roll onto core stock sheet 25. The guide surface covers an arc of approximately 90° and has a curvature of approximately 4-5 inches radius. Preferably, surface 66 is provided with a plurality of elongated, parallel grooves 67 which serve to distribute the vacuum more evenly over the entire surface. Each of the grooves is provided with a plurality of vacuum passageways 68 which communicates with the hollow interior of the shoe. It will be appreciated that each of the grooves 67 terminates at the exit edge 31 of the vacuum shoe as indicated at 69. This maintains a partial vacuum at the interface between the film sheet 32 or 33 and the core stock sheet 25 to minimize air bubbles and irregularities therebetween. Of course, it is not intended that the present invention be limited to the use of vacuum shoes as illustrated in FIGS. 6 and 6a as various modified constructions may be found suitable for mating the film sheets with the core stock sheet when carrying out the method of the present invention.

Figure 7:
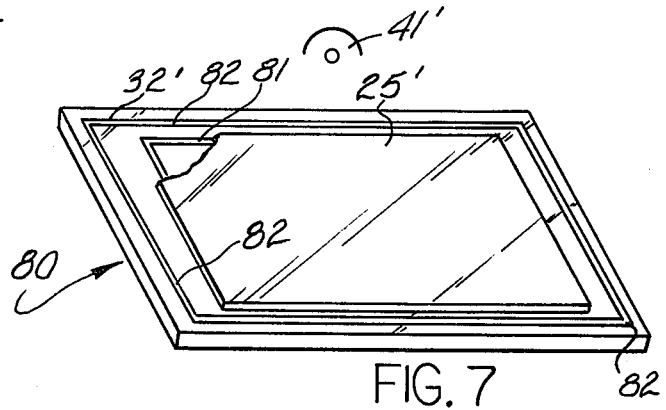
FIG. 7 is an isometric illustration of an alternative embodiment of the present invention illustrating an alternative method of tacking a surface laminate to core stock.

FIG. 7 is illustrative of an embodiment for tacking a surface laminate film to one side of a core stock sheet. Advantages of the present invention are still provided in that distortion of the printed magnetic area is minimized upon lamination. In FIG. 7, primed numbers are used to denote elements corresponding to those illustrated in FIG. 2. In the embodiment of FIG. 7, a vacuum chuck 80 is provided including inner and outer rectangular vacuum grooves 81 and 82. A sheet 25' of core stock is placed on the vacuum chuck 80 and held by the vacuum groove 81. A sheet 32' of surface laminate film is placed on the sheet 25' and is retained thereover by the vacuum groove 82. Tacking is performed by use of a radiant energy source 41', and the method of the present invention proceeds in a manner as described above.

What is thus provided is a method for making a magnetically encodable card having a magnetically encodable area formed on a lamina thereof in which distortion of the area during card manufacture is minimized. In the above-described method, the magnetically encoded areas are printed onto the lamina by silk screening or other appropriate means. It is foreseeable, of course, and within the scope of the present invention, to provide an encodable card structure by the method of the present invention but having an encodable magnetic panel which is formed on the lamina by means other than printing. For example, "hot stamping," roller applications, or a form of wet coating other than silk-screening may be utilized to apply the magnetic panel.

I claim:

1. A method for making a magnetically encodable article comprising the steps of:
    advancing a relatively rigid core stock layer in a path through a work station;
    feeding a flexible, non-porous surface laminate sheet from a roll supply source into engagement with the core stock layer;
    providing a vacuum shoe intermediate the roll supply source and the core stock layer for maintaining a partial vacuum at the interface of the surface laminate sheet and the core stock layer whereby movement of the surface laminate sheet over and in contact with the vacuum shoe causes the surface laminate sheet to adhere to the core stock layer by means of static electricity;
    tacking the surface laminate sheet to the core stock layer subsequent to adherence of the surface laminate sheet to the core stock layer while the core stock layer is being advanced in the path;
    applying a magnetically encodable medium directly to a predetermined area on the surface laminate sheet subsequent to tacking of the surface laminate sheet to the core stock layer; and
    laminating the surface laminate sheet to the core stock layer;
    said tacking step comprising advancing the core stock layer and the surface laminate sheet past a radiation source positioned adjacent the path while directing radiant energy along narrow areas on the core stock layer and the surface laminate sheet extending transverse to the core stock layer,
    whereby the surface laminate sheet is adhered to the core stock layer at points of contact therewith impinged upon by the radiant energy.
2. The method according to claim 1 wherein the step of applying a magnetically encodable medium includes the step of printing said magnetically encodable medium directly onto said predetermined area.

3. A method according to claim 2 wherein said step of printing said magnetically encodable medium comprises the step of silk-screening said magnetically encodable medium.

4. The method according to claim 3 further comprising the additional step of feeding a second surface laminate sheet into engagement with said core stock layer on the side thereof opposite the first-mentioned surface laminate sheet and in the same manner and tacking said second surface laminate sheet to said core stock layer prior to the laminating step.

5. The method according to claim 5 wherein said surface laminate sheets are tacked simultaneously to opposite sides of said core stock layer.

6. The method of claim 5 wherein said step of tacking said surface laminate sheets to opposite sides of said core stock layer comprises advancing said core stock layer and the surface laminate sheets together past a pair of radiant energy sources disposed on opposite sides of said core stock layer and directing radiant energy at said core stock layer and the surface laminate sheets whereby said surface laminate sheets are adhered to said core stock layer at points of contact therewith.

7. The method of claim 6 wherein said radiant energy sources direct radiant energy to relatively small areas on opposite sides of said core stock layer whereby the amount of distortion of said core stock layer is not significant.

* * * * *